Figure 1:
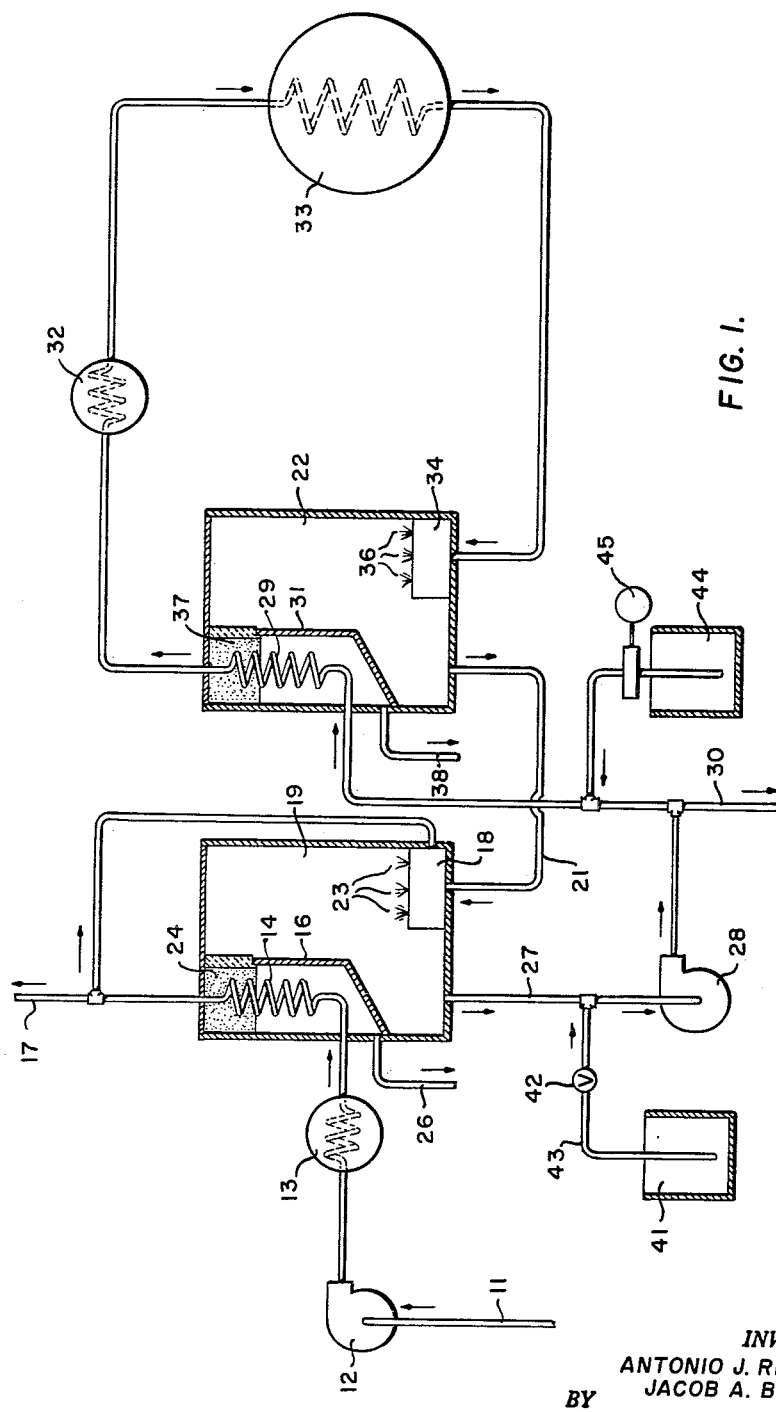

June 2, 1964     A. J. RISTAINO ETAL     3,135,670
PROCESS FOR TREATING SEA WATER FOR SEA WATER FLASH EVAPORATORS
Filed Aug. 31, 1960     2 Sheets-Sheet 1

*INVENTORS*
ANTONIO J. RISTAINO
JACOB A. BAUMAN
BY
*Howard W. Hermann*
AGENT.

United States Patent Office 3,135,670
Patented June 2, 1964

3,135,670
PROCESS FOR TREATING SEA WATER FOR SEA WATER FLASH EVAPORATORS
Antonio J. Ristaino, Annapolis, and Jacob A. Bauman, Harundale, Md., assignors to the United States of America as represented by the Secretary of the Navy
Filed Aug. 31, 1960, Ser. No. 53,316
12 Claims. (Cl. 202—57)
(Granted under Title 35, U.S. Code (1952), sec. 266)

The invention described herein may be manufactured and used by or for the Government of the United States of America for governmental purposes without the payment of any royalties thereon or therefor.

The present invention relates to water distillation and more particularly to water distillation wherein sea water is treated to prevent formation of scale on the distilling unit and/or to facilitate removal of sludges from the unit without interruption of operation.

Various types of evaporating and distilling units are used to provide pure water from sea water. In general sea water is passed through an evaporator which is heated by a supply of heating steam. Pure water is evaporated from the sea water and is condensed by cooling. In the flash type sea water distilling units to which this invention is particularly adapted the sea water is heated under pressure and then expanded in a flash chamber to produce water vapor.

It is well known that sea water contains salts of calcium and magnesium which form hard, adherent, refractory deposits of carbonate, sulfate, and hydroxide scales on the brine heat transfer surfaces. It has been found that such scaling is not a serious problem provided the temperature of the sea water is maintained below about 170° F., and makes only one quick pass through the heaters, the brine then being discharged from the system. This procedure, however fails to afford optimum economy because the distillate (fresh water production) to brine ratio is only about 1:20 indicating considerable rejection of heat and high pumping power requirements since a large quantity of sea water must be pumped into the system to replace the brine which is discharged.

Greater efficiency can be attained by recirculating the brine to recover heat and by operating at higher brine temperatures. This also results in a considerable reduction in the rate of brine discharge which is particularly important when the system is used, for example, in deeply submerged submarines. The primary disadvantage of utilizing brine recirculation and higher brine temperatures has been the formation of scale on the brine heat transfer surfaces of the system. The hard scale material deposited on the walls of the brine heat transfer surfaces offers a serious resistance to the transfer of heat to the liquid from the heating medium and thereby over a period of time decreases the efficiency of the system to the point where the system must be shut down to permit the necessary cleaning operations to remove the scale deposits.

The instant invention provides a method of chemical treatment of the feedwater which obviates the disadvantages inherent in prior high temperature recirculating sea water distilling systems.

Accordingly it is an object of the present invention to provide a method for allowing continuous operation of a high temperature recirculating sea water distilling unit.

Another object is the provision of a process of treating sea water for the prevention of scale on the heat transfer surface of sea water distilling units.

A further object is the provision of a method for cleaning sludge from sea water distilling units without withdrawal of the unit from operation.

Figure 2:
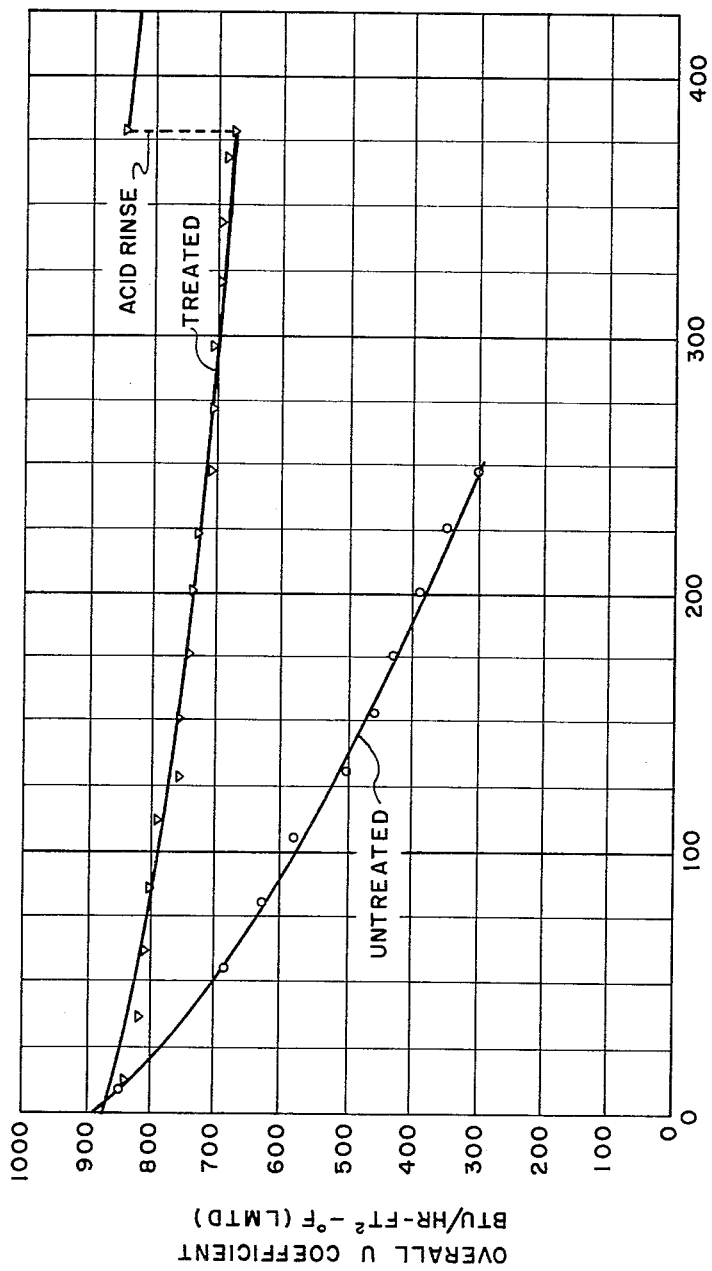

Other objects and many of the attendant advantages of this invention will be readily appreciated as the same becomes better understood by reference to the following details and descriptions when considered in connection with the accompanying drawings in which like reference numerals designate like parts throughout the figures thereof, and wherein:

FIG. 1 is a diagrammatic view of a recirculating type sea water flash distilling unit incorporating the present invention; and FIG. 2 is a performance graph of the system of FIG. 1 showing the variation of the coefficient of heat transmission as a function of the numbers of hours of operation for treated and untreated feed water.

Referring now to FIG. 1, there is shown diagrammatically a typical recirculating sea water flash distilling unit which has been altered for use with the present invention. All heat exchangers have been shown in the drawing as coils for the sake of simplicity but it will be realized that each is a multiplicity of tubes and may have any desired configuration. Sea water enters the system through feedwater intake pipe or the like, 11 by means of a sea water supply pump 12 and is passed through distillate cooler 13 wherein hot distillate leaving the system is passed over the tubes carrying the incoming sea water in order to recover a portion of the heat being carried out of the system by the distillate. The sea water absorbs a portion of this heat and carries it back into the system.

The sea water is then passed through the tubes 14 of the second stage condenser 16 where it is heated by water vapor within the condenser. A portion of the heated sea water is then discharged overboard through overflow pipe 17 and the remainder is fed into feedbox 18 of second stage flash chamber 19 where it is mixed with hot brine entering feedbox 18 through feeder line 21 from first stage flash chamber 22. A partial vacuum is maintained in the second stage flash chamber 19 so that as the brine feedwater mixture is sprayed into the flash chamber through a series of jets or nozzles 23, a portion of the water "flashes" to vapor causing the remaining brine to be cooled to the saturation temperature at the second stage flash chamber pressure. The water vapor flows through vapor separator 24 which removes entrained salt particles to first stage condenser 16 where it is condensed by the cool incoming feed water and discharged through distillate outlet pipe 26.

The brine leaves second stage flash chamber 19 by means of brine outlet line 27 and is pumped by means of recirculation pump 28 through condenser tubes 29 of first stage condenser 31. A portion of the brine leaving pump 28 is discharged from the system by means of brine discharge pipe 30. Condenser tubes 29 act to condense water vapor produced by first stage flash chamber 22 and again the brine flowing through the condenser tubes is heated.

The brine then enters the air ejector after-condenser 32. Although the system as shown in FIG. 1 shows only the sea water system because the sea water system is the only part of the distilling unit with which the instant invention is concerned, it will be realized by those skilled in the art that the unit also has steam, condensate, distillate, and purge systems which are not shown in order to avoid unnecessary confusion. The air ejector is steam motivated and is used to purge the vacuum chambers including the flash chambers and sea water heater of noncondensibles. The after-condenser is used to condense the steam in its jacket or shell and thereby recover heat from the steam by transferring it to the sea water system while also recovering the condensate formed from the steam. Thus the circulating brine again gains heat in the air ejector after-condenser 32 and is passed on to the sea water heater 33 wherein steam is supplied to heat the brine to its proper final temperature. From sea water heater 33 the heated brine passes on to first stage feedbox 34, sprays through nozzles 36, and is partially vaporized in first stage flash chamber 22 due to the partial vacuum which is maintained therein. The water vapor passes through vapor separator 37 into condenser 31 and the distillate formed by condensation leaves the system through distillate outlet pipe 38. The remaining brine passes, in the embodiment shown, through line 21 back to second stage feedbox 18 to be recycled. It will be realized however that additional stages may be included in the system in which case the brine would be fed into the feedbox of a third stage rather than back into the second stage as shown. It will also be realized that each stage is designed to operate at a different temperature and therefore the absolute pressure (partial vacuum) maintained in each stage must be adjusted accordingly to allow vaporizing of water at the temperature used.

The system as thus far described is subjected to build-up of scale on the heat transfer surfaces and if no further provision were to be made, the unit would need to be shut down frequently for cleaning. However, in accordance with the present invention, there are provided means for feeding chemicals into the system so that the device need never be taken out of operation for cleaning purposes.

As shown in FIG. 1, there is connected to brine outlet line 27 an acid injection tank 41 designed for feeding chemical into the system. The flow of chemicals entering the system is controlled by means of a valve 42 in line 43. To the line between recirculation pump 28 and first stage condenser 31, but after brine discharge pipe 30, there is also connected a chemical treatment tank 44 designed to feed chemicals into the system by means of a chemical feed pump or the like 45. It will be realized that the specific points at which the chemical treatment tank and acid injection tanks are connected into the system may be varied to some extent without changing the operation of the distilling unit.

In accordance with this invention, there is continuously injected into the system from chemical treatment tank 44 a water soluble pyrophosphate, e.g. $Na_4P_2O_7$ in concentrations of not more than 20–40 parts per million of feedwater entering the system through pump 12 and as low as one part per million. This treatment prevents deposition of hard crystalline scale but allows a very gradual deposition of a loose, amorphous sludge, a major portion of which is a magnesium phosphate. To redissolve the slight sludges formed, there is also added to the feedwater a water soluble salt of a polyamino acid in a weight ratio of 5 or less parts of the salt to one part of the pyrophosphate. Sodium salts of ethylenediamine tetraacetic acid

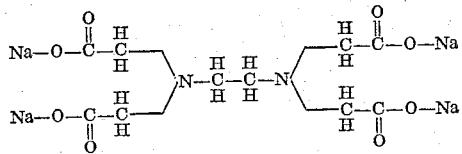

have been found to be suitable for this purpose. However, it has been found that the pyrophosphate is itself effective in preventing a hard scale and may be used without the poly amino acid salt, although this will require a more frequent rinsing of the system to rid the system of sludge.

After long operation of the system some sludges will accumulate in the heaters causing a loss in efficiency of the system. It has been discovered that the sludge formed either with or without the poly amino acid salts can be rinsed away by a mild acid solution. For example in actual tests by adding sulfamic acid in an amount not greater than one-half the weight of the feed treatment chemicals used since the last cleaning, the system was restored to clean condition within 5 minutes. The acid is injected from acid injection tank 41 by vacuum drag while the unit is in operation and acts as a sludge mobilizer so that the sludge is carried out of the system as solids along with the brine discharge. The unit remains in production the entire time.

FIGURE 2 illustrates the operation of the system with and without feedwater treatment. In the curves shown in FIG. 2, hours of operation of the unit are plotted as abscissas and the overall coefficients of heat transmission U in the sea water heater, expressed in British thermal units per hour per square foot of surface per degree Fahrenheit rise are plotted as ordinates. It will be realized that the sea water heater has the greatest tendency to scale of all the heat exchangers. Therefore the performance of this unit is used for illustration. At the beginning of each of the runs shown in the figure the system was clean. The lower curve represents the untreated run wherein sea water was fed through the system with no additives. As shown by the curve, at the end of 250 hours of operation the heat transferred was only about one third of what it was at the beginning of the run when the equipment was clean. This loss in efficiency is directly attributable to the formation of scale on the heat transfer surfaces. The surfaces act as crystal seeds to activate the crystallization of the scale forming ingredients in the supersaturated solutions attained at the heat transfer surfaces. The scales form a definite solid structure which will diffract X-rays in a characteristic pattern. Since the scales are true crystals and grow on the walls of the containers, they actually become part of the container and are very difficult to dislodge.

The top curve in FIG. 2 shows operation of the system when the feedwater is treated with water soluble pyrophosphate and a sodium salt of ethylenediamine tetraacetic acid in accordance with the instant invention. As can be seen from this curve at the end of 380 hours of operation the heat transfer coefficient is still over 75 percent of its original value. At this point if a sulfamic acid rinse is provided as hereinbefore described, the coefficient returns to practically 100 percent of its original value.

The pyrophosphate in the feedwater slowly develops a metal phosphate compound that is released from the main body of the solution by virtue of insolubility rather than by a seeding process on the surface of the vessel. These precipitates are fine particles that deposit on the container walls if they are not swept out of the container by the velocity of the fluid. The large exposed surfaces of these particles lend themselves to removal through chemical cleaning methods.

The atomic structure, distance between atoms and the size of the molecule are dominant factors in determining if a solid from a solution will be a crystalline solid or an amorphous sludge. Molecules need time and geometrical freedom to form well ordered solids or crystals.

The pyrophosphate molecule is a large polyvalent polymer which apparently does not have the freedom to arrange itself in an orderly array for crystal formation especially since phosphate precipitations are rapid ionic reactions, when conditions are favorable for precipitation.

Other poly phosphates such as water soluble tripoly and hexameta phosphates have also been tried but these were found to be ineffective in preventing scale formation.

It will be realized by those skilled in the art that the chemical injection points shown in the described embodiment of the present invention are subject to some variation. Acids other than sulfamic acid such as sodium bisulphate, sulfuric acid, and muriatic acid have been and may be satisfactorily used to rinse sludge from the system.

Obviously many modifications and variations of the present invention are possible in the light of the above teachings. It is therefore to be understood that within the scope of the appended claims the invention may be practiced otherwise than as specifically described.

What is claimed is:

1. In a flash type evaporator system for producing distilled water from sea water, the method of preventing scale deposits on brine heat transfer surfaces comprising the steps of injecting into the feedwater a water soluble pyrophosphate in concentrations of from one to forty parts per million of the feedwater and periodically injecting a mild acid solution to the feedwater to rinse sludges from the system.

2. The invention as defined in claim 1 wherein said mild acid solution is sulfamic acid.

3. The invention as defined in claim 1 wherein said mild acid solution is sodium bisulphate.

4. The invention as defined in claim 1 wherein said mild acid solution is sulphuric acid.

5. The invention as defined in claim 1 wherein said mild acid solution is muriatic acid.

6. In a flash type evaporator system for producing distilled water from sea water, the method of preventing scale deposits on brine heat transfer surfaces comprising the steps of continuously injecting into the feedwater a water soluble pyrophosphate in concentrations of between one and forty parts per million of the feedwater, continuously injecting a water soluble salt of a poly amino acid with the water soluble pyrophosphate in weight ratio of not more than 5 to 1 of the pyrophosphate, and periodically injecting a mild acid solution to rinse sludge from the system.

7. The invention as defined in claim 6 wherein said mild acid solution is sulfamic acid.

8. The invention as defined in claim 6 wherein said mild acid solution is sodium bisulphate.

9. The invention as defined in claim 6 wherein said mild acid solution is sulphuric acid.

10. The invention as defined in claim 6 wherein said mild acid solution is muriatic acid.

11. The invention as defined in claim 6 wherein said water soluble salt of a poly amino acid is a sodium salt of ethylenediamine tetraacetic acid.

12. In a flash type sea water distilling unit, the method of preventing scale deposits on the brine heat transfer surfaces which comprises continuously injecting $Na_4P_2O_7$ into the feedwater in concentrations of from one to forty parts per million, continuously injecting a sodium salt of ethylenediamine tetraacetic acid in weight ratio of 1 part of $Na_4P_2O_7$ to 5 or less parts of the salt, and periodically rinsing the system by injecting into the feedwater sulfamic acid not greater in weight than about one half the combined weight of the $Na_4P_2O_7$ and sodium salt of ethylenediamine tetraacetic acid which has been added since the previous rinsing.

References Cited in the file of this patent

UNITED STATES PATENTS

| | | |
|---|---|---|
| 1,903,041 | Hall et al. | Mar. 28, 1933 |
| 1,956,515 | Hall | Apr. 24, 1934 |
| 2,148,006 | Arveson | Feb. 21, 1939 |
| 2,299,748 | Hatch | Oct. 27, 1942 |
| 2,326,950 | Kepfer | Aug. 17, 1943 |
| 2,358,965 | Durgin et al. | Sept. 26, 1944 |
| 2,381,960 | Johnson | Aug. 14, 1945 |
| 2,756,035 | Axelrad | July 24, 1956 |
| 2,777,818 | Gambill | Jan. 15, 1957 |

OTHER REFERENCES

"Institution of Mechanical Engineers," Proceedings B, vol. 1B, 1952–1953.

Betz Handbook of Industrial Water Conditioning, 5th edition, 1957, pp. 66–69, 37–40 relied on.

Symposium on Saline Water Conversion, 1957, Nat'l Academy of Sci., Nat'l Research Council publication 568, pp. 37 and 48 relied on.